(No Model.)
R. STALTER.
CAR WHEEL.
No. 413,740. Patented Oct. 29, 1889.
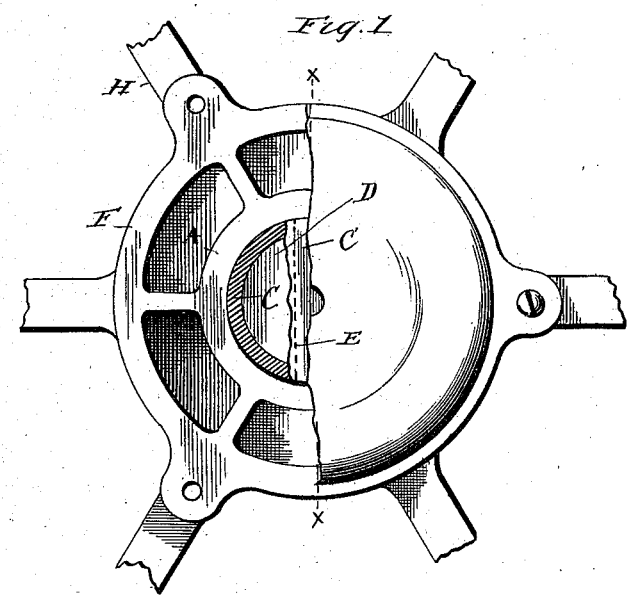
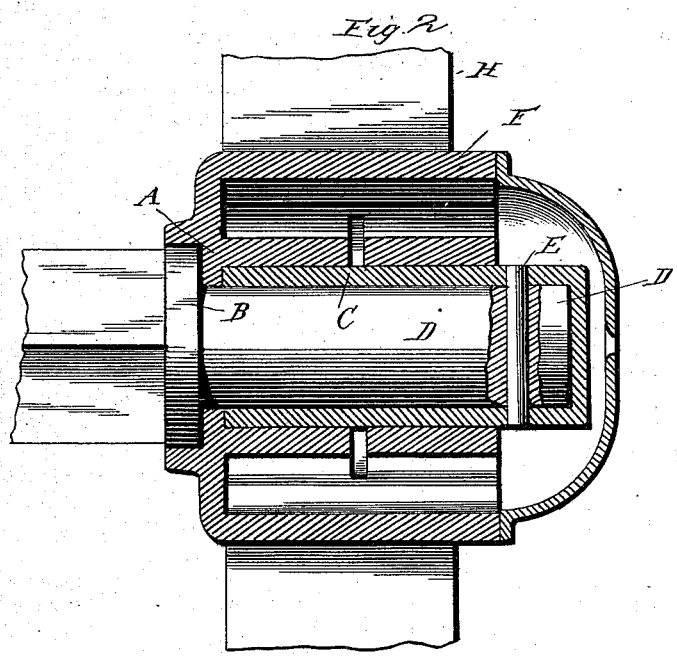
Witnesses
Inventor
Robert Stalter.
By his Attorneys

UNITED STATES PATENT OFFICE.

ROBERT STALTER, OF NEW STRAITSVILLE, OHIO.

CAR-WHEEL.

SPECIFICATION forming part of Letters Patent No. 413,740, dated October 29, 1889.

Application filed July 18, 1889. Serial No. 317,922. (No model.)

*To all whom it may concern:*

Be it known that I, ROBERT STALTER, a citizen of the United States, residing at New Straitsville, in the county of Perry and State of Ohio, have invented certain new and useful Improvements in Car-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to car-wheels, and has for its object to provide a self-lubricating wheel in which the wearing or bearing parts are submerged and covered by the lubricator.

A further object is to provide a locking-sleeve, which also takes the wear, and which can be replaced at small cost or turned to present a new bearing-surface.

The improvement consists in the novel features which will hereinafter be more fully described and claimed, and shown in the annexed drawings, in which—

Figure 1 is a side view, parts being broken away, of a wheel embodying my invention. Fig. 2 is a cross-section on the line $x\,x$ of Fig. 1.

F represents the chambered hub of the car-wheel H, which carries the lubricant.

A is a flanged collar cast solid in said hub at one end thereof. The axle-collar B takes a bearing in and against said flanged collar A. Sleeve C passes over axle D and takes a firm bearing against inside of flanged collar A, said sleeve C being held firmly on axle by means of a pin, key, or bolt E, and adapted to turn freely relative to hub F.

The flanged collar A contains three principles, as follows: first, a shoulder for axle-collar B; second, to form a lock-shoulder with sleeve C; third, to admit of the oil or other lubricant to come in direct and continual contact with the axle-sleeve C.

The flanged collar A by means of its peculiar construction prevents any of the oil or lubricant from running out or wasting. The hub F, turning freely on the sleeve C, the oil or lubricant being held above lower side or bearing of F by reason of collar A, causes the said sleeve to run in oil to the depth of said collar A before any can escape, causing all the wear to be made in oil. Sleeve C being made of slightly softer metal than hub F, will wear faster than hub F, and by removing sleeve C, at small cost, a new sleeve can be put on, thereby making the wheel practically new; or, at the option of the operator, by removing pin, key, or bolt E said sleeve may be turned half-way around on axle D, renewing the bearing on worn side.

The oil is admitted to the inside oil-chamber through the hole in the hub-cap, which is made secure to wheel-hubs by means of bolts. The oilways in hub admit the oil on bearing.

Having described my invention, what I claim, and desire to secure by Letters Patent, is—

1. The combination, with the wheel having the flanged collar A, and the axle having collar B, to bear against one side of collar A, of the sleeve C, held on the axle and obtaining a bearing on the opposite side of collar A, substantially as and for the purpose described.

2. The combination, with the wheel having chambered hub for containing the lubricant and having flanged collar A, of the axle having collar B, and the sleeve held on the axle and adapted to bear on collar A, substantially as described.

3. The combination, with the wheel having chambered hub and oil-passages and having collar A, of the axle having collar B, the sleeve held on the axle and adapted to bear against the collar A, and the cap-plate, substantially as described.

In testimony whereof I affix my signature in presence of two witnesses.

ROBERT STALTER.

Witnesses:
JOSEPH TURNER,
JOHN HORDEN.